United States Patent
Tonegawa

(10) Patent No.: US 8,593,674 B2
(45) Date of Patent: Nov. 26, 2013

(54) METHOD AND APPARATUS FOR ESTIMATING FILE SIZE BEFORE TRANSMISSION OF IMAGE DATA

(75) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 13/014,309

(22) Filed: Jan. 26, 2011

(65) Prior Publication Data

US 2011/0188078 A1 Aug. 4, 2011

(30) Foreign Application Priority Data

Feb. 2, 2010 (JP) .................................. 2010-021270

(51) Int. Cl.
*G06F 3/12* (2006.01)
(52) U.S. Cl.
USPC ......... 358/1.15; 358/1.13; 358/402; 709/206; 709/231; 709/247
(58) Field of Classification Search
USPC ......... 358/1.15, 1.13, 402; 707/609; 709/203, 709/206, 231, 247
See application file for complete search history.

(56) References Cited

U.S. PATENT DOCUMENTS

| 6,687,742 B1* | 2/2004 | Iwazaki ........................ 709/206 |
| 2004/0136022 A1* | 7/2004 | Kizaki et al. ................. 358/1.13 |
| 2004/0230700 A1* | 11/2004 | Oomori ......................... 709/247 |
| 2009/0150493 A1* | 6/2009 | Tonegawa .................... 709/206 |
| 2010/0299307 A1* | 11/2010 | Kusumoto .................... 707/609 |

FOREIGN PATENT DOCUMENTS

| JP | 08191427 A | * | 7/1996 | ............... H04N 5/92 |
| JP | 2004-341821 A | | 12/2004 | |
| JP | 2009033455 A | * | 2/2009 | |

* cited by examiner

*Primary Examiner* — King Poon
*Assistant Examiner* — David S Cammack
(74) *Attorney, Agent, or Firm* — Canon USA Inc. IP Division

(57) ABSTRACT

An image processing apparatus stores a plurality of conversion conditions for converting input image data and, if the image data is converted according to each conversion condition, information indicating a relationship between a data size of the image data before conversion and a data size of transmission data that is acquired after conversion by associating the conversion conditions and the information with each other; sets the conversion condition for converting the input image data according to an instruction from a user, estimates the data size of the transmission data that is acquired if the input image data is converted according to the set conversion condition, using the stored information; and issues a notification to the user based on a result of the estimation.

8 Claims, 16 Drawing Sheets

FIG. 7A

E-MAIL MODE, "JPEG" OR "NON-HIGH COMPRESSED PDF"

| | | | A4 PAPER SIZE | B4 PAPER SIZE | A3 PAPER SIZE |
|---|---|---|---|---|---|
| CHARACTER | COLOR | LOW | y=1.137x − 1002000 | y=1.297x − 2666545 | y=1.326x − 3993451 |
| | | HIGH | y=1.913x − 11062000 | y=0.841x + 31097 | y=2.568x − 22812719 |
| | GRAY SCALE | LOW | y=2.417x − 2198000 | y=1.693x − 1995322 | y=1.839x − 3260461 |
| | | HIGH | y=2.507x − 9624000 | y=1.896x − 9464519 | y=1.958x − 13339769 |
| CHARACTER AND PHOTO | COLOR | LOW | y=1.170x − 1529996 | y=1.297x − 2666545 | y=1.326x − 3993451 |
| | | HIGH | y=1.328x − 7602016 | y=0.841x + 31097 | y=2.568x − 22812719 |
| | GRAY SCALE | LOW | y=1.602x − 910628 | y=1.693x − 1995322 | y=1.839x − 3260461 |
| | | HIGH | y=1.823x − 6177639 | y=1.896x − 9464519 | y=1.958x − 13339769 |
| PHOTO | COLOR | LOW | y=0.635x + 838898 | y=1.214x − 1290143 | y=1.063x − 1062452 |
| | | HIGH | y=0.953x − 950686 | y=1.902x − 8316305 | y=2.4494x − 14171941 |
| | GRAY SCALE | LOW | y=2.309x − 1646920 | y=2.460x − 2707846 | y=2.655x − 4341529 |
| | | HIGH | y=2.304x − 7006371 | y=2.588x − 12485537 | y=2.461x − 15337371 |

FIG. 7B

E-MAIL MODE, "HIGH-COMPRESSED PDF"

| | | | A4 PAPER SIZE | B4 PAPER SIZE | A3 PAPER SIZE |
|---|---|---|---|---|---|
| CHARACTER | COLOR | 300*300 | y=0.097x − 130000 | y=0.105x − 230000 | y=0.070x − 130000 |
| | GRAY SCALE | 300*300 | y=0.169x − 150000 | y=0.194x − 250000 | y=0.154x − 240000 |
| CHARACTER AND PHOTO | COLOR | 300*300 | y=0.097x − 130000 | y=0.105x − 230000 | y=0.070x − 130000 |
| | GRAY SCALE | 300*300 | y=0.169x − 150000 | y=0.194x − 250000 | y=0.154x − 240000 |
| PHOTO | COLOR | 300*300 | y=0.146x − 280000 | y=0.202x − 690000 | y=0.140x − 560000 |
| | GRAY SCALE | 300*300 | y=0.374x − 370000 | y=0.487x − 800000 | y=0.370x − 750000 |

FIG. 8A

E-MAIL MODE, "NON-HIGH COMPRESSED PDF"

| | | A4 PAPER SIZE | B4 PAPER SIZE | A3 PAPER SIZE |
|---|---|---|---|---|
| CHARACTER | LOW | y=0.166x − 140000 | y=0.143x − 160000 | y=0.135x − 200000 |
| | HIGH | y=0.168x − 540000 | y=0.144x − 680000 | y=0.139x − 868000 |
| CHARACTER AND PHOTO | LOW | y=0.311x − 441214 | y=0.288x − 517055 | y=0.138x − 309564 |
| BLACK AND WHITE BINARY | HIGH | y=0.394x − 2381528 | y=0.338x − 2357447 | y=0.504x − 2933110 |
| PHOTO | LOW | y=1.168x − 865516 | y=1.280x − 1563605 | y=1.098x − 811019 |
| | HIGH | y=3.771x − 33111541 | y=2.933x − 34989696 | y=3.604x − 33085505 |

FIG. 8B

INTERNET FAX MODE

| | | A4 PAPER SIZE | B4 PAPER SIZE | A3 PAPER SIZE |
|---|---|---|---|---|
| CHARACTER | LOW | y=0.166x − 140000 | y=0.143x − 160000 | y=0.135x − 200000 |
| | HIGH | y=0.168x − 540000 | y=0.144x − 680000 | y=0.139x − 868000 |
| CHARACTER AND PHOTO | LOW | y=0.311x − 441214 | y=0.288x − 517055 | y=0.138x − 309564 |
| BLACK AND WHITE BINARY | HIGH | y=0.394x − 2381528 | y=0.338x − 2357447 | y=0.504x − 2933110 |
| PHOTO | LOW | y=1.168x − 865516 | y=1.280x − 1563605 | y=1.098x − 811019 |
| | HIGH | y=3.771x − 33111541 | y=2.933x − 34989696 | y=3.604x − 33085505 |

FIG. 9A

JPEG SETTING

| | HIGH COMPRESSION | NORMAL | LOW COMPRESSION |
|---|---|---|---|
| MAGNIFICATION | 0.564 | 1 | 1.29 |

FIG. 9B

HIGH-COMPRESSED PDF SETTING

| | HIGH COMPRESSION | NORMAL | LOW COMPRESSION |
|---|---|---|---|
| MAGNIFICATION | 0.661 | 1 | 2.563 |

METHOD AND APPARATUS FOR ESTIMATING FILE SIZE BEFORE TRANSMISSION OF IMAGE DATA

BACKGROUND OF THE INVENTION

1. Field of the Invention

The present invention relates to an image processing apparatus that transmits image data, a control method thereof, and a storage medium.

2. Description of the Related Art

Conventionally, a technique for transmitting image data via a network has been known. For example, input image data can be transmitted as an attached file to an e-mail.

When the image data is transmitted via the network, a size of the image data becomes large depending on a format and the number of pages thereof which can cause traffic of a network to be increased.

Particularly, when the image data is transmitted with an e-mail, if the e-mail having the attached image data with a large size is transmitted, a transmission error can occur. As a cause of such an error, it is conceivable that the maximum value of the data size that can be processed is set to a mail server that relays the e-mail. More specifically, the e-mail having the data size exceeding the maximum value set to the mail server cannot be relayed by the mail server, so that the transmission error may occur.

To addressing the issues described above, according to Japanese Patent Application Laid-Open No. 2004-341821, a technique for calculating a size of data to be actually transmitted and presenting the data size to a user when the image data is transmitted is known. As described above, by presenting the data size of the data to be transmitted to the user, when the data size is too large, the user can determine to cancel the transmission, thus, execution of useless transmission processing can be avoided.

As described above, it is known that the user is informed of the data size of the data to be transmitted (hereafter, referred to as "transmission data"). However, conventionally, it has taken a long time to inform the user of the data size.

According to the technique described in Japanese Patent Application Laid-Open No. 2004-341821, after the input image data is converted according to a specified conversion condition, the data size of the transmission data that has been actually acquired by the conversion processing is presented to the user. Therefore, when the conversion processing takes time, presenting the data size also delays as much as the time. Specifically, when a conversion condition that needs a long-time to perform processing or a large number of pages is included in the image data, it takes a long time until the data size is presented.

If it takes a long time to present the data size, for example, a user who intends to read and transmit images on a document has to wait in front of an apparatus until conversion processing has been completed after reading the images, so that an operation efficiency is reduced. Further, when reading the document has been completed, the user who is not familiar with the operation may leave the apparatus with the document without knowing that the data size is to be presented.

SUMMARY OF THE INVENTION

The present invention is directed to a system for estimating a data size of transmission data that is acquired when image data is converted according to a set conversion condition and promptly informing a user of the size thereof.

According to an aspect of the present invention, an image processing apparatus includes an input unit configured to input image data, a storage unit configured to store a plurality of conversion conditions for converting the image data input by the input unit and, if the image data is converted according to each conversion condition, information indicating a relationship between a data size of the image data before conversion and a data size of transmission data that is acquired after conversion by associating the conversion conditions and the information with each other, a setting unit configured to set the conversion condition for converting the image data input by the input unit according to an instruction from a user, an estimation unit configured to, if the conversion condition is set by the setting unit, estimate the data size of the transmission data that is acquired when the image data input by the input unit is converted according to the set conversion condition, using the information stored in the storage unit, a notification unit configured to issue a notification to the user based on a result of the estimation performed by the estimation unit, and a transmission unit configured to convert the image data input by the input unit according to the conversion condition set by the setting unit and transmit the transmission data that is acquired by the conversion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B illustrate tables in which a plurality of conversion conditions and information indicating relationships between data sizes of image data before conversion and data sizes of transmission data that are acquired after conversion are associated with each other.

FIGS. 8A and 8B illustrate tables in which a plurality of conversion conditions and information indicating relationships between data sizes of image data before conversion and data sizes of transmission data that are acquired after conversion are associated with each other.

FIGS. 9A and 9B illustrate a correction level of an estimated value of a data size according to a compression ratio of a joint photographic experts group (JPEG) setting and a correction level of an estimated value of a data size according to a background image quality level of a high-compressed portable document format (PDF) according to the exemplary embodiment of the present invention.

DESCRIPTION OF THE EMBODIMENTS

Various exemplary embodiments, features, and aspects of the invention will be described in detail below with reference to the drawings.

Figure 1:
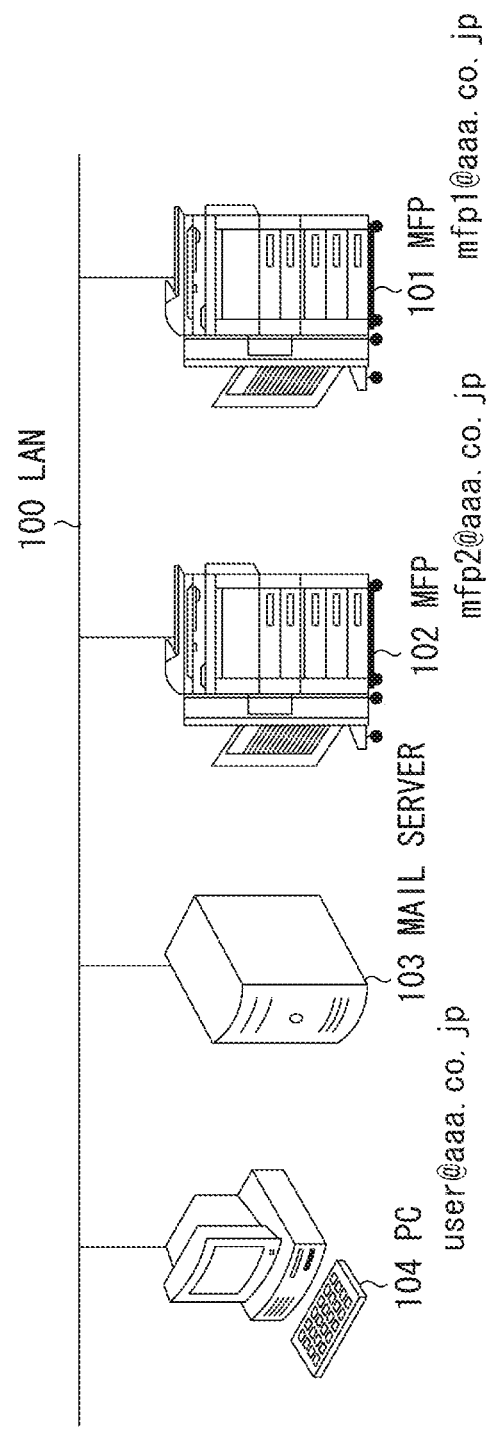
FIG. 1 illustrates an entire image processing system according to an exemplary embodiment of the present invention.

FIG. 1 illustrates an entire image processing system according to a first exemplary embodiment. Multifunction peripherals (MFP) 101 and 102, a mail server 103, and a personal computer (PC) 104 are communicably connected with each other via a local area network (LAN) 100. The MFP 101 is a multi functional peripheral provided with a scanner and a printer as described below. Further, the MFP 101 includes a function of transmitting image data by attaching to an e-mail. The image data is generated by reading a document with the scanner or received via the LAN 100.

Mail addresses are assigned to the MFPs 101 and 102 and the PC 104 as illustrated in FIG. 1. By specifying the mail address as a destination, the e-mail can be transmitted to a desired destination.

For example, when an e-mail is transmitted from the MFP 101 to the PC 104, firstly, the MFP 101 transmits the e-mail to the mail server 103 according to a simple mail transfer protocol (SMTP). Subsequently, the PC 104 acquires the e-mail stored in the mail server 103 according to a post office protocol (POP). An example in which only one mail server 103 exists is described, however, a plurality of mail servers may work together to relay the e-mail.

When the e-mail is transmitted from the MFP 101 to the MFP 102, as with the case of the e-mail transmitted to the PC 104, the e-mail can be transmitted via the mail server 103. Further, the e-mail can be also transmitted not via the mail server 103. More specifically, since the MFP 102 is provided with a SMTP server function, the MFP 101 and the MFP 102 can communicate with each other according to the SMTP protocol to directly transmit the e-mail from the MFP 101 to the MFP 102.

Whether the e-mail is transmitted via the mail server or not via the mail server, a user can freely select it as described below. Further, transmission of the e-mail not via the mail server is only available in an Internet facsimile mode as described below, but cannot be selected in an e-mail mode.

Figure 2:
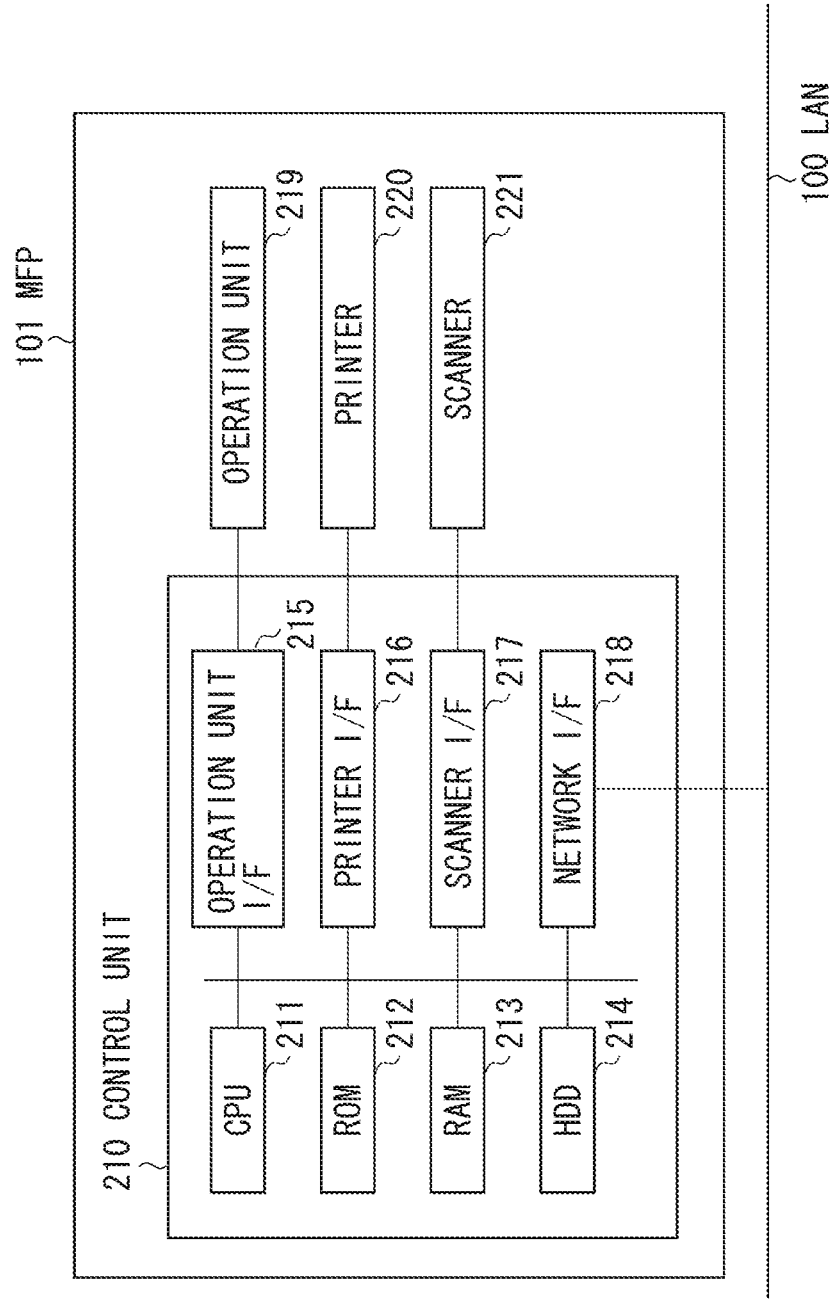
FIG. 2 is a block diagram illustrating a configuration of a multifunction peripheral (MFP) according to the exemplary embodiment of the present invention.

FIG. 2 is a block diagram illustrating a configuration of the MFP 101. A control unit 210 including a central processing unit (CPU) 211 controls an entire operation of the MFP 101. The CPU 211 reads a control program stored in a read only memory (ROM) 212 to perform various types of control such as reading control and transmission control. A random access memory (RAN) 213 is used as a temporary storage region of a main memory and a working area of the CPU 211.

A hard disk drive (HDD) 214 stores image data, various types of programs, or various information tables (e.g., tables illustrated in FIGS. 7, 8 and 9). An operation unit interface (I/F) 215 connects an operation unit 219 to the control unit 210. The operation unit 219 is provided with a liquid crystal display unit having a touch panel function or a key board.

A printer I/F 216 connects a printer 220 to the control unit 210. Image data to be printed by the printer 220 is transferred from the control unit 210 via the printer I/F 216 and printed on the recording medium by the printer 220.

A scanner I/F 217 connects a scanner 221 to the control unit 210. The scanner 221 reads an image on a document to generate image data, and then inputs the image data into the control unit 210 via the scanner I/F 217.

A network I/F 218 connects the control unit 210 (MFP 101) to the LAN 100. The network I/F 218 transmits the image data and various pieces of information to an external apparatus (e.g., the MFP 102 or the mail server 103) on the LAN 100, and receives various pieces of information from the external apparatus on the LAN 100.

Next, a transmission function which the MFP 101 has will be described. The MFP 101 can input the image data generated by reading the document with the scanner and the image data received via the LAN 100, and then transmit the input image data using various types of transmission methods. According to the first exemplary embodiment, a case where the image data is transmitted using the e-mail will be described as one of the transmission methods. However, in addition to this method, a function for transmitting the image data using a facsimile communication or a file transfer protocol may be also provided.

The MFP 101 is provided with two modes which are an e-mail mode and an Internet facsimile mode as a transmission mode for transmitting the image data by attaching the image data to the e-mail. The Internet facsimile mode is a transmission mode for transmitting the image data in a format compliant with an Internet facsimile standard specified in the request for comments (RFC) 2305.

More specifically, the input image data is converted into a tag image file format (TIFF) file specified in RFC3949 and the converted image data is transmitted by attaching to the e-mail. The MFP (e.g., MFP 102) that is a reception side receiving the e-mail takes out the image data from the received e-mail, and then prints the image data.

Following description will be given assuming that the Internet facsimile mode provided for the MFP 101 can transmit not color image data but only monochrome image data. However, the MFP 101 may be configured to be able to transmit the color image data.

On the other hand, the e-mail mode is the transmission mode for transmitting the image data in a format other than the format compliant with the Internet facsimile mode. More specifically, in the e-mail mode, the image data in various types of file formats, such as JPEG or PDF as well as TIFF, can be transmitted by being attached to the e-mail.

An example in which either JPEG or PDF (high-compressed PDF or non-high compressed PDF) can be selected as a file format that can be transmitted by the e-mail mode is described. Further, TIFF and the file format other than TIFF may be also selected.

Since the MFP 102 has similar functions and configurations to those of the MFP 101, the description thereof will not be repeated.

Figure 3:
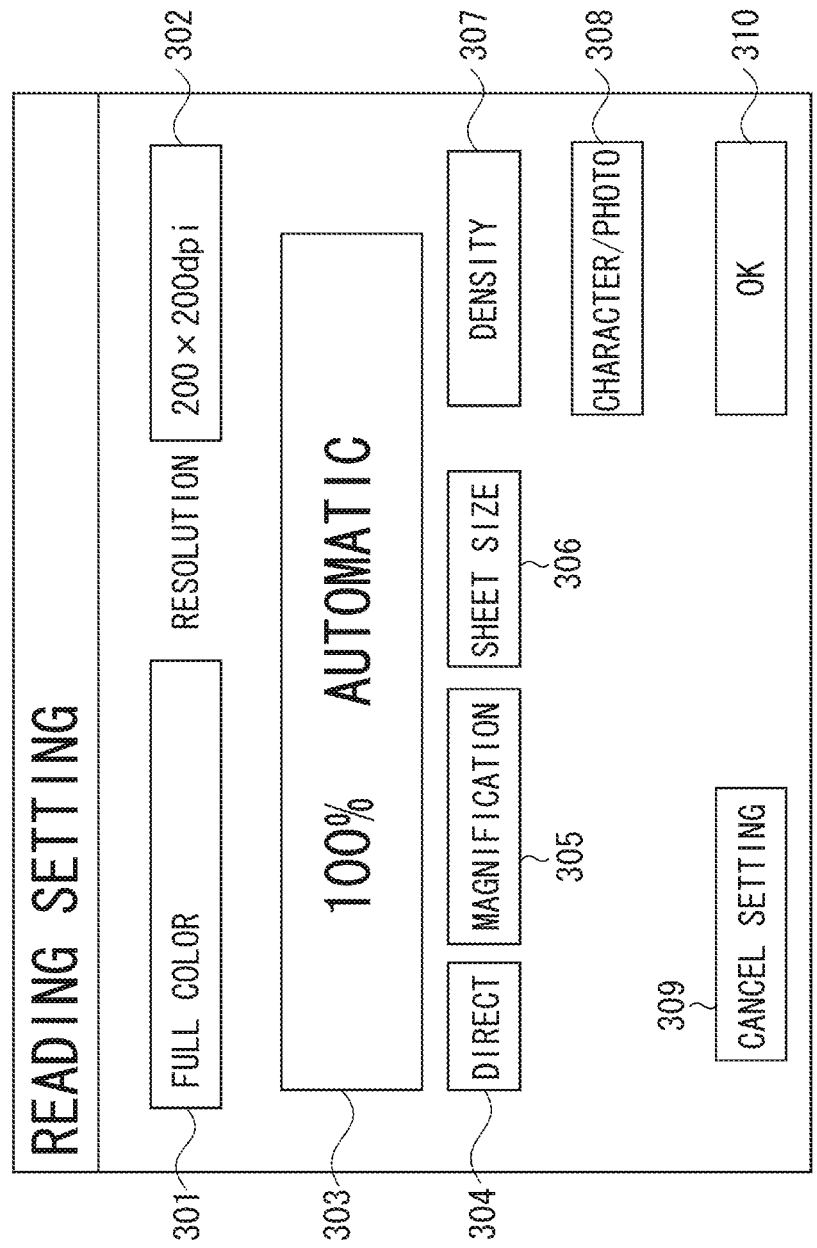
FIG. 3 illustrates an example of a screen displayed on an operation unit according to the exemplary embodiment of the present invention.

FIG. 3 illustrates one of operation screen groups that are used to perform various types of settings for transmitting the image data which is input by reading the image on the document and attached to the e-mail. FIG. 3 illustrates an example of the operation screen for setting a reading parameter related to reading processing performed by the scanner 221.

An item 301 is used to select which color mode of "FULL COLOR", "GRAY SCALE", and "BLACK AND WHITE BINARY" is used to read a document. Further, "AUTO COLOR SELECTION" for automatically determining which color mode is used to read the document according to the image on the document can be also selected.

An item 302 is used to select a resolution for reading the image on the document. As the resolution, any of "100×100 dpi", "150×150 dpi", "200×100 dpi", "200×200 dpi", "200× 400 dpi", "300×300 dpi", "400×400 dpi", or "600×600 dpi" can be selected.

A region 303 displays a magnification and a paper size that have been selected up until then. An example illustrated in FIG. 3 shows that "100%" is selected for the magnification and "AUTO" is selected for the paper size. To change the magnification, an item 305 is used to select an arbitrary magnification. Further, to return the magnification to "100%", a button 304 may be pressed. The paper size can be selected from "AUTO", "A5", "B5", "A4", "B4", "A3", "LTR", "STMT", and "11×17".

An item 307 is used to select reading density within a range from "−4" to "+4". An item 308 is used to select a document type from among "CHARACTER", "CHARACTER AND PHOTO", and "PHOTO".

When a button 309 is pressed, all contents that have been selected up until then are reset. When a button 310 is pressed, contents that have selected up until then are determined and registered.

Figure 4:
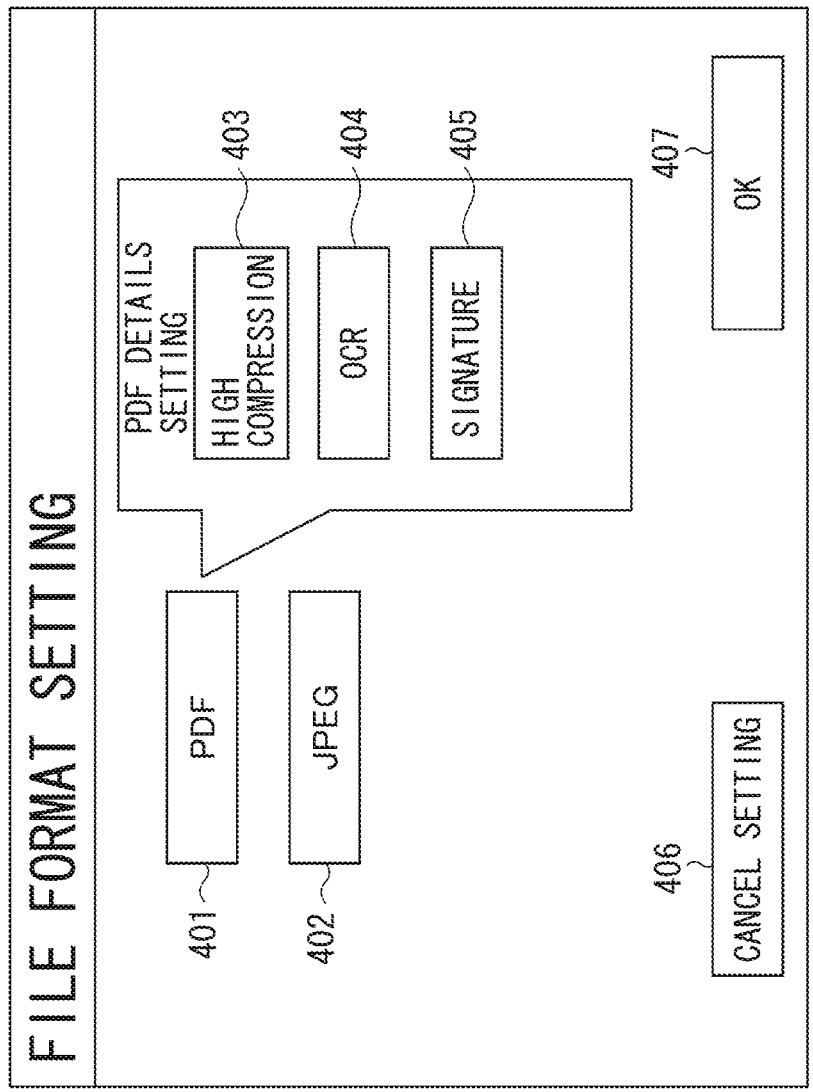
FIG. 4 illustrates an example of a screen displayed on the operation unit according to the exemplary embodiment of the present invention.

FIG. 4 illustrates an example of the operation screen for selecting a file format of the image data to be transmitted. An item 401 is selected when the image data is converted into a file in the PDF format and transmitted. Further, an item 402 is selected when the image data is converted into a file in the JPEG format and transmitted.

Items 403 to 405 become valid only when the item 401 is selected. The item 403 is selected when the image data is converted into a file in the high-compressed PDF format and transmitted. When the item 403 is selected, the image data is separated into an image region and a character region. the data size can be decreased by lowering the resolution of the image section. On the other hand, when the item 403 is not selected, the image data is converted into a file in the non-high compressed PDF format.

When the item 404 is selected, optical character reader (OCR) processing is performed on the image data using a character recognition function, and a character code acquired as a processing result is added to the image data in the PDF format. When the item 405 is selected, information about the MFP 101 and information indicating a user operating the MFP 101 are added as an electronic signature to the image data in the PDF format.

When a button 406 is pressed, all contents that have been selected up until then are reset. When a button 407 is pressed, contents that have selected up until then are determined and registered.

Figure 5:
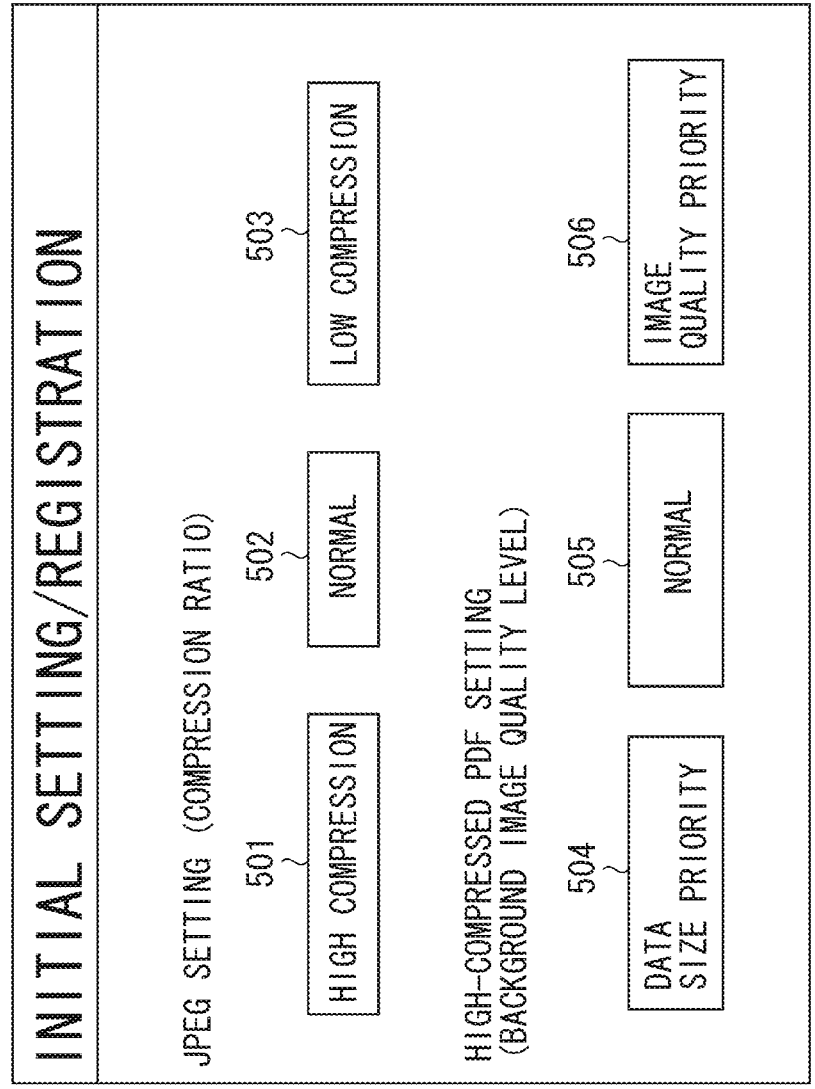
FIG. 5 illustrates an example of a screen displayed on the operation unit according to the exemplary embodiment of the present invention.

FIG. 5 illustrates an example of the operation screen for selecting a compression ratio for converting the image data into a file in the JPEG format and selecting a background image quality level for converting the image data into a file in the high-compressed PDF format.

Buttons 501 to 503 are used to select the compression ratio for converting the image data into a file in the JPEG format. When the "HIGH COMPRESSION" is selected using the button 501, a file having a small data size is generated. However, deterioration in image quality is large compared with cases where other buttons are selected. On the other hand, when "LOW COMPRESSION" is selected using the button 503, high quality of the image can be maintained compared with cases where other buttons are selected. However, the data size of the generated file becomes large.

Buttons 504 to 506 are used to select the image quality level when the image data is converted into a file in the high-compressed PDF format. When "DATA SIZE PRIORITY" is selected using the button 504, a file in a small data size is generated. However, deterioration in the image quality is large compared with cases where other buttons are selected. On the other hand, when "IMAGE QUALITY PRIORITY" is selected using the button 506, high quality of the image can be maintained compared with cases where other buttons are selected. However, the data size of the generated file becomes large.

Figure 6:
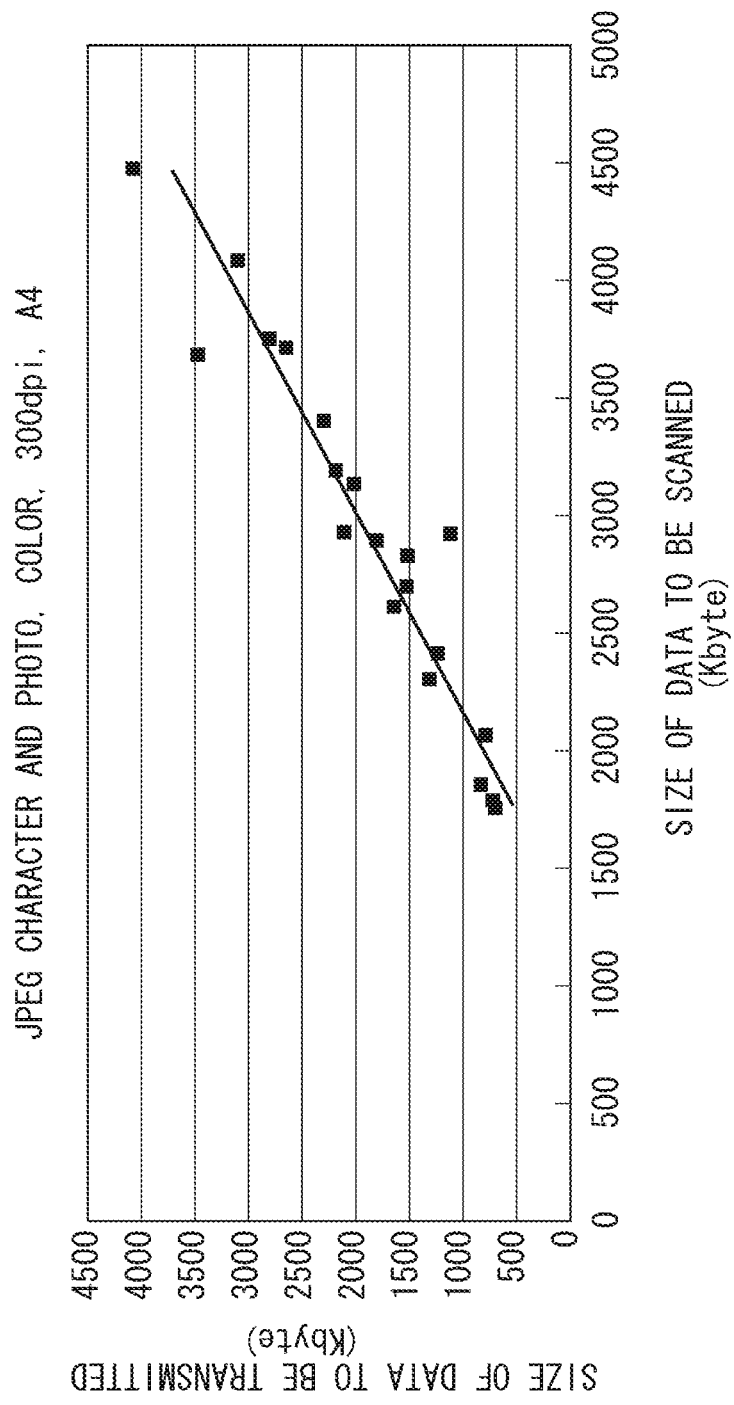
FIG. 6 illustrates a relationship between data sizes of scanned data and data sizes of data to be transmitted according to the exemplary embodiment of the present invention.

FIG. 6 illustrates a relationship between the data sizes of the image data (scanned data) input from the scanner 221 and the data sizes of the image data (transmission data) acquired by conversion according to the specific conversion conditions. FIG. 6 illustrates an example in which the image data read according to settings including "FULL COLOR" for the color mode, "300×300 dpi" for the resolution, "A4" for the paper size, and "CHARACTER AND PHOTO" for the document type is converted into a file in the JPEG format.

In FIG. 6, values of the data sizes of the transmission data pieces which are acquired by conducting an experiment for actually converting a plurality of scanned data pieces having different data sizes are plotted. As illustrated in FIG. 6, the relationship between the data sizes of the scanned data and the data sizes of the transmission data can be roughly indicated in a straight line, including some errors. When "x" is defined as the size of the scanned data, and "y" is defined as that of the transmission data, "x" and "y" can be approximated by an equation $y=1.170x-1529996$. As described above, the data sizes of the scanned data and that of the transmission data acquired after conversion have the relationship that can be indicated by a linear function. FIGS. 7A and 7B, and FIGS. 8A and 8B illustrate equations corresponding to each conversion conditions.

FIG. 7A illustrates amounts of changes in the data sizes when the image data is converted under the condition that the e-mail mode is selected and "JPEG" or "NON-HIGH COMPRESSED PDF" is selected on the setting screen illustrated in FIG. 4. When "JPEG" or "NON-HIGH COMPRESSED PDF" is selected in the e-mail mode, the following parameters can be further selected. More specifically, any of the document types of "CHARACTER", "CHARACTER AND PHOTO", and "PHOTO" is selected using the item 308 on the setting screen illustrated in FIG. 3. Further, either the color modes of "FULL COLOR" or "GRAY SCALE" is selected using the item 301 on the setting screen illustrated in FIG. 3. A case in which "BLACK AND WHITE BINARY" is selected will be described below with reference to FIG. 8A.

Furthermore, the resolution is selected using the item 302 illustrated in FIG. 3. The resolution selected at this point is classified into two types of "LOW" and "HIGH", as illustrated in FIG. 7A. Among the resolutions that can be selected by the item 302, the resolutions "100×100 dpi", "150×150 dpi", "200×100 dpi", "200×200 dpi", "300×300 dpi" are classified into "LOW". On the other hand, the resolutions "200×400 dpi", "400×400 dpi", and "600×600 dpi" are classified into "HIGH".

A reason why the selectable resolutions are classified into two types as described above is that the scanner 221 can generate image data in two types of resolutions, "300×300 dpi" and "600×600 dpi", and the resolutions other than that can be processed by changing the magnification for reducing the resolution. More specifically, in a group of the resolutions of "100×100 dpi" to "300×300 dpi", the relationship between the data size of the scanned data and the data size of the transmission data acquired after conversion is expressed by the same equation. Similarly, in a group of the resolutions of "200×400 dpi" to "600×600 dpi", the relationship between the data size of the scanned data and the data size of the transmission data acquired after conversion is expressed by the same equation.

Further, any of the paper sizes of "A4", "B4", and "A3" is selected using the item 306 in FIG. 3.

In FIG. 7A, for each combination of the document type, the color mode, the resolution, and the paper size, the equations expressing the relationship between the data sizes of the scanned data and the data sizes of the transmission data acquired by converting the scanned data are managed. For example, when "E-MAIL MODE", "JPEG", "PHOTO", "COLOR", and "200×200 dpi" are set, the equation $y=0.635x+838898$ can be acquired from the table illustrated in FIG. 7A. The value of "y" acquired when the data size of the scanned data is substituted for the value "x" in this equation is an estimated value of the data size of the transmission data acquired after conversion. In the equations illustrated in FIG. 7A, and FIGS. 7B, 8A, and 8B described below, the values "x" and "y" are expressed in byte unit.

FIG. 7B illustrates amounts of changes in the data sizes when the image data is converted under the condition that the e-mail mode is selected and "HIGH-COMPRESSED PDF" is selected on the setting screen illustrated in FIG. 4. When "HIGH-COMPRESSED PDF" is selected in the e-mail mode, the following parameters can be further selected. More specifically, any of the document types of "CHARACTER", "CHARACTER AND PHOTO", and "PHOTO" is selected using the item 308 on the setting screen illustrated in FIG. 3. Further, either the color modes of "FULL COLOR" or "GRAY SCALE" is selected using the item 301 on the setting screen illustrated in FIG. 3.

It is assumed that when "HIGH-COMPRESSED PDF" is selected, "BLACK AND WHITE BINARY" of the color mode cannot be selected. Further, when "HIGH-COMPRESSED PDF" is selected, the resolution other than "300×300 dpi" cannot be selected. Furthermore, any of the paper sizes of "A4", "B4", and "A3" is selected using the item 306 in FIG. 3.

In FIG. 7B, for each combination of the document type, the color mode, and the paper size, the equations expressing the relationship between the data sizes of the scanned data and the data sizes of the transmission data acquired by converting the scanned data are managed.

FIG. 8A illustrates amounts of changes in the data sizes when the image data is converted under the condition that the e-mail mode is selected, "NON-HIGH COMPRESSED PDF" is selected on the setting screen illustrated in FIG. 4, and "BLACK AND WHITE BINARY" is selected using the item 301 illustrated in FIG. 3. When "NON-HIGH COMPRESSED PDF" and "BLACK AND WHITE BINARY" are selected in the e-mail mode, the following parameters can be further selected. More specifically, any of the document types of "CHARACTER", "CHARACTER AND PHOTO", and "PHOTO" is selected using the item 308 on the setting screen illustrated in FIG. 3.

Further, the resolution is selected using the item 302 illustrated in FIG. 3. The resolution selected at this point is classified into two types of "LOW" and "HIGH", based on the same reason as that in FIG. 7A. Furthermore, any of the paper sizes of "A4", "B4", and "A3" is selected using the item 306 in FIG. 3.

In FIG. 8A, for each combination of the document type, the resolution, and the paper size, the equations expressing the relationship between the data sizes of the scanned data and the data sizes of the transmission data acquired by converting the scanned data are managed.

FIG. 8B illustrates amounts of changes in the data sizes when the image data is converted in the case where the Internet facsimile mode is selected. When the Internet facsimile mode is selected, the following parameters can be further selected. More specifically, any of the document types of "CHARACTER", "CHARACTER AND PHOTO", and "PHOTO" is selected using the item 308 on the setting screen illustrated in FIG. 3. It is assumed that when the Internet facsimile mode is selected, color modes other than "BLACK AND WHITE BINARY" cannot be selected using the item 301 on the setting screen illustrated in FIG. 3.

Further, the resolution is selected using the item 302 illustrated in FIG. 3. The resolution selected at this point is classified into two types of "LOW" and "HIGH", based on the same reason as that in FIG. 7A. Furthermore, any of the paper sizes of "A4", "B4", and "A3" is selected using the item 306 in FIG. 3.

In FIG. 8B, for each combination of the document type, the resolution, and the paper size, the equations expressing the relationship between the data sizes of the scanned data and the data sizes of the transmission data acquired by converting the scanned data are managed.

As will be understood by comparing FIG. 8A with FIG. 8B, although there is a difference of the format between "NON-HIGH COMPRESSED PDF" and "TIFF", the equation corresponding to each combination of the document type, the resolution, and the paper size is common between FIGS. 8A and 8B.

FIG. 9A illustrates a correction level of an estimated value of the data size according to the compression ratio of the JPEG setting selected using the buttons 501 to 503 illustrated in FIG. 5. For example, when "HIGH COMPRESSION" is selected using the button 501, a correction for multiplying the estimated value of the data size acquired by the equation managed in the table illustrated in FIG. 7A by 0.564 is performed. On the other hand, when "LOW COMPRESSION" is selected using the button 503, a correction for multiplying the estimated value of the data size acquired by the equation managed in the table illustrated in FIG. 7A by 1.29 is performed.

FIG. 9B illustrates a correction level of the estimated value of the data size according to a background image quality level of the high-compressed PDF selected using the buttons 504 to 506 illustrated in FIG. 5. For example, when "DATA SIZE PRIORITY" is selected using the button 504, a correction for multiplying the estimated value of the data size acquired by the equation managed in the table illustrated in FIG. 7B by 0.661 is performed. On the other hand, when "IMAGE QUALITY PRIORITY" is selected using the button 506, a correction for multiplying the estimated value of the data size acquired by the equation managed in the table illustrated in FIG. 7B by 2.563 is performed.

Figure 10:
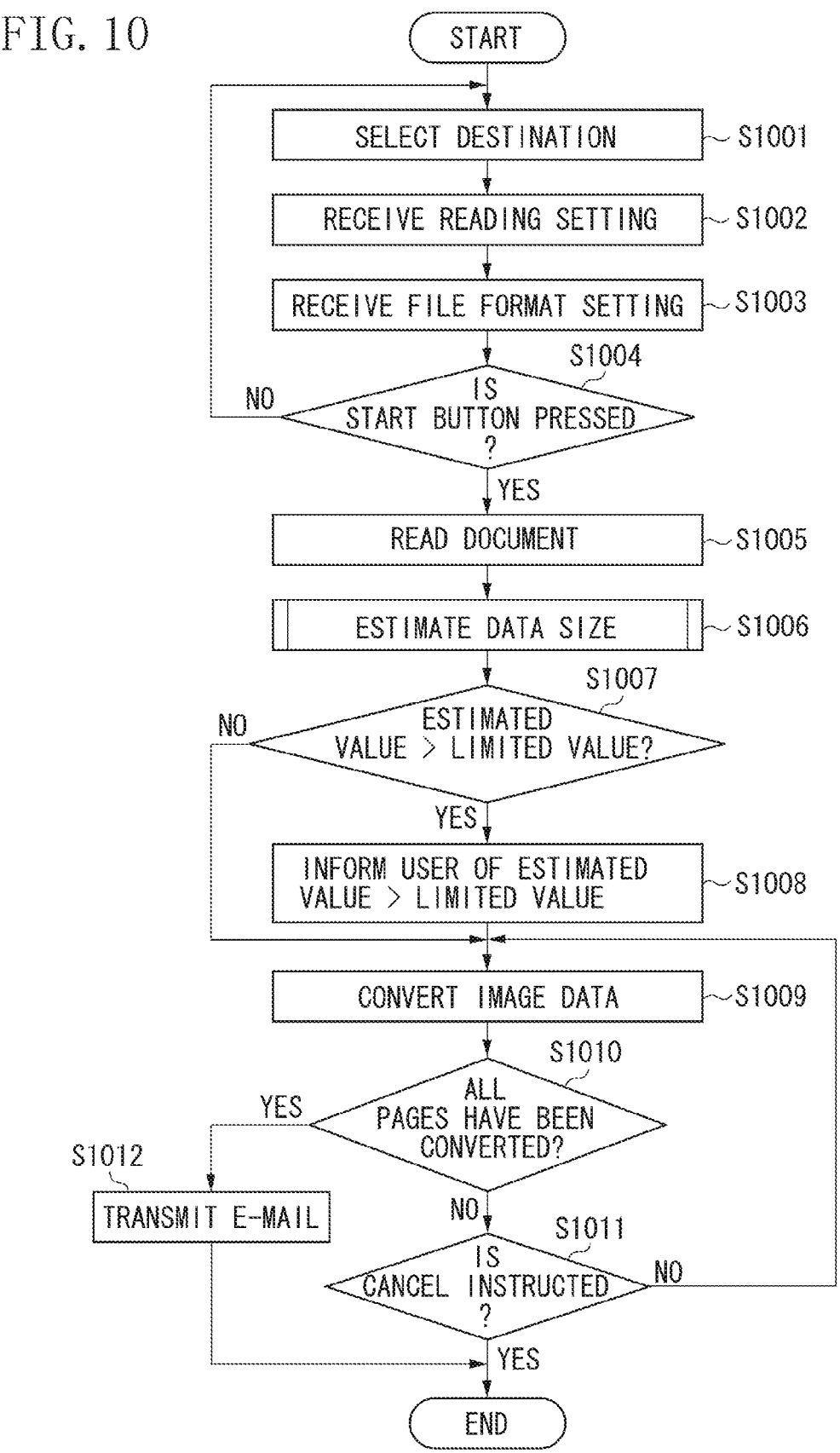
FIG. 10 is a flowchart illustrating an operation of the MFP according to the exemplary embodiment of the present invention.
Figure 12:
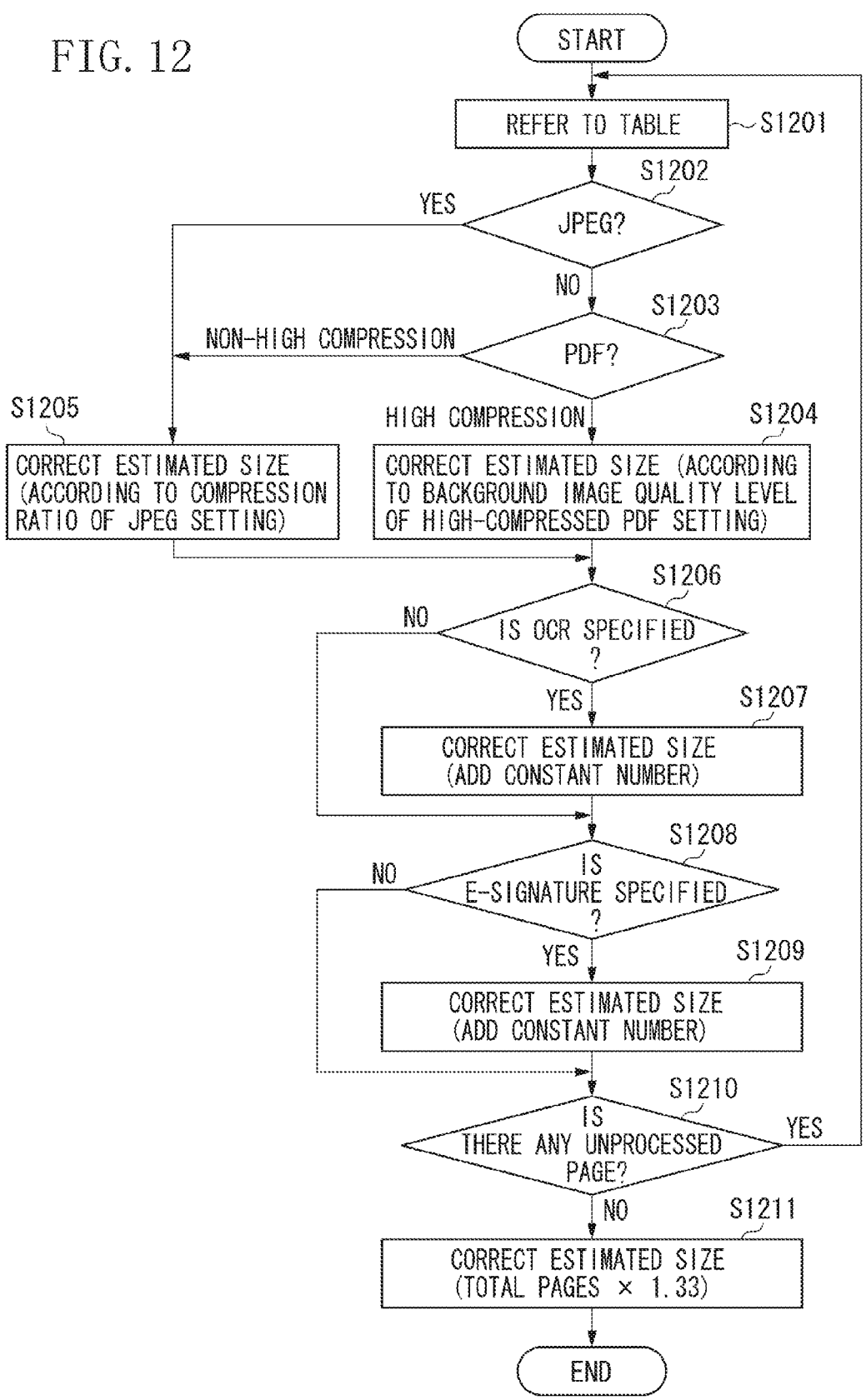
FIG. 12 is a flowchart illustrating an operation of the MFP according to the exemplary embodiment of the present invention.
Figure 13:
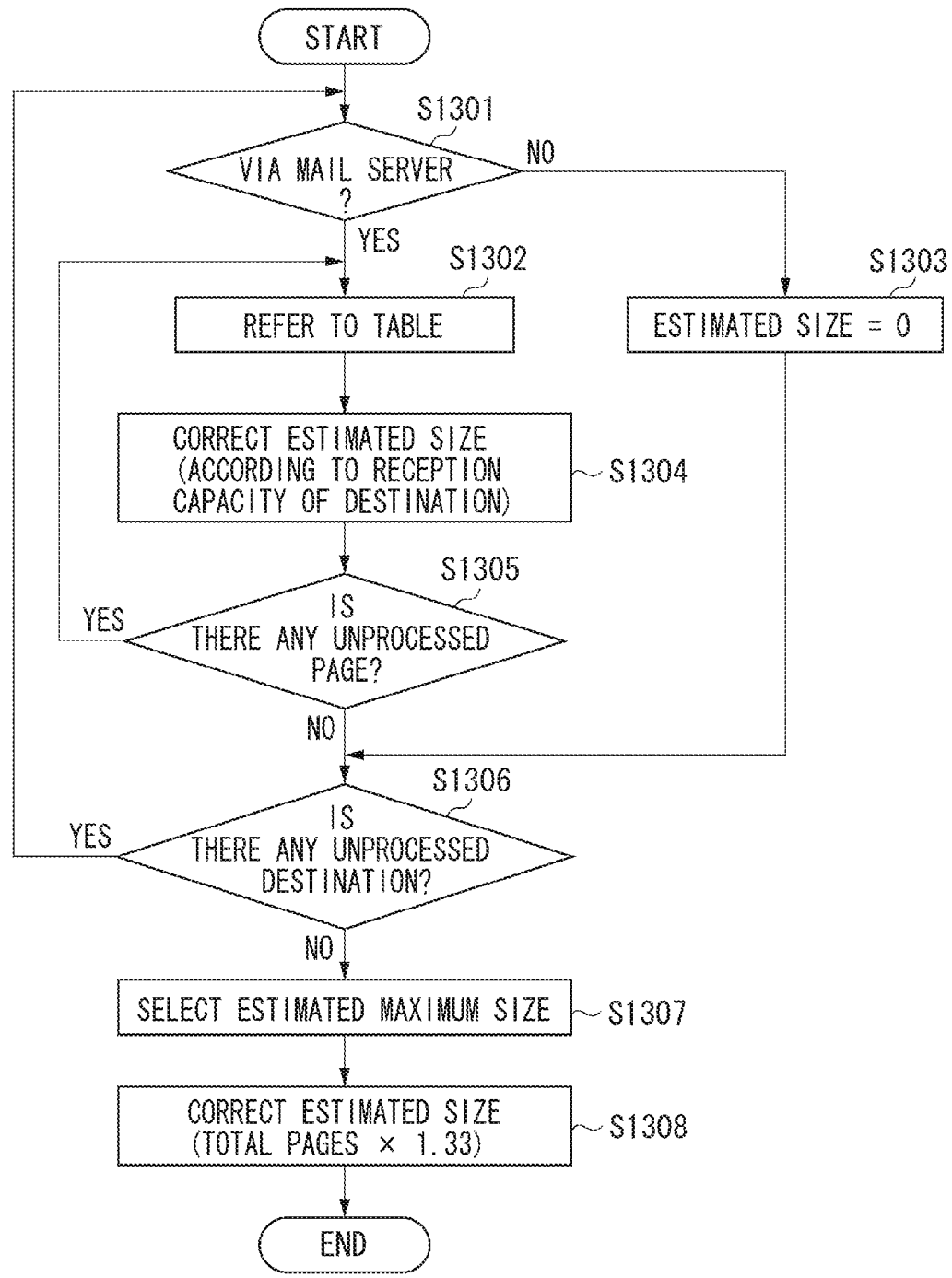
FIG. 13 is a flowchart illustrating an operation of the MFP according to the exemplary embodiment of the present invention.

FIGS. 10, 12, and 13 are flowcharts for each illustrating a series of processing for attaching image data input by reading with scanner 221 to the e-mail and transmitting the image data. Each operation (step) in the flowcharts illustrated in FIGS. 10, 12, and 13 is realized when the CPU 211 in the MFP 101 executes a control program stored in the HDD 214.

In step S1001 in FIG. 10, a transmission destination of the image data (e-mail) is specified via the operation screen (not illustrated). More specifically, the mail address such as mfp2@aaa.co.jp for the MFP 102 and user@aaa.co.jp for the PC 104 is specified. In this step, in addition to the transmission destination, either the e-mail mode or the Internet facsimile mode is selected. Further, the relationship between the transmission destination and the transmission mode may be registered in advance in an address book held in the HDD 214.

In step S1002, the reading setting including various types of parameters are received via the operation screen illustrated in FIG. 3. In step S1003, the setting of the file format is received via the operation screen illustrated in FIG. 4.

In step S1004, whether a start button (not illustrated) has been pressed is determined. If it is determined that the start button has been pressed (YES in step S1004), the processing proceeds to step S1005. If not (NO in step S1004), the processing returns to step S1001.

In step S1005, the scanner 221 is controlled according to the reading setting received in step S1002 to read the image on the document and generate image data based on the image.

In step S1006, based on the data size of the image data input from the scanner 221 and the settings received in steps S1001 to S1003, the estimated value of the data size of the transmission data is calculated. Details of the processing will be described below with reference to FIGS. 12 and 13.

In step S1007, it is determined whether the calculated estimated value exceeds a limited value or not. In step S1007, a value of 5 Mbyte is set in advance as the limited value, however, a manager of the MFP 101 can freely change the value. As a result of determination, if the estimated value exceeds the limited value (YES in step S1007), the processing proceeds to step S1008. Or, if not, (NO in step S1008), the processing proceeds to step S1009.

Figure 11:
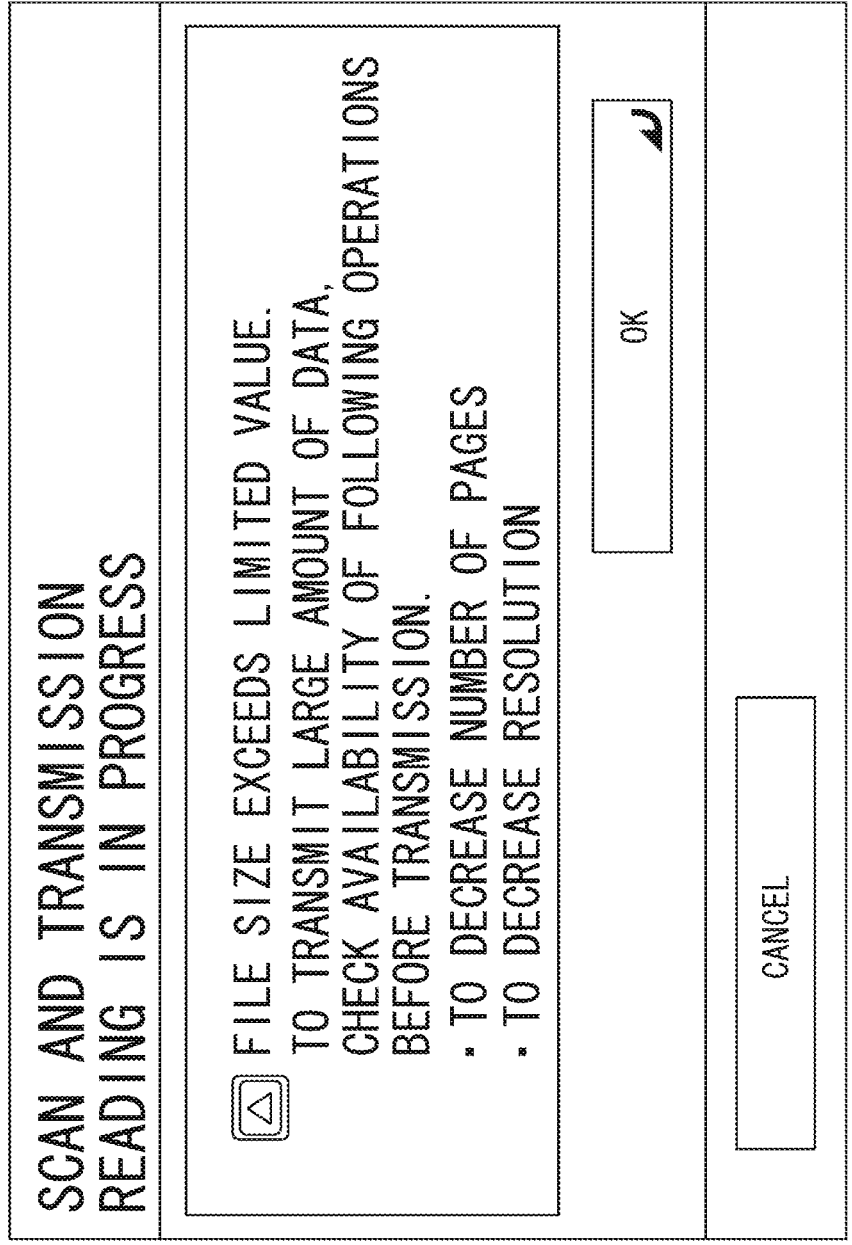
FIG. 11 illustrates an example of a screen displayed on an operation unit according to the exemplary embodiment of the present invention.

In step S1008, a screen illustrated in FIG. 11 is displayed on the operation unit 219 to inform a user that the estimated data size of the transmission data is large. In addition to the message illustrated in FIG. 11, information such as the calculated estimated value and the set limited value may be notified to the user. As a result of the determination in step S1007, if the estimated value does not exceed the limited value (NO in step S1007), the processing in step S1008 is omitted. In other words, when the estimated data size of the transmission data is small enough, unnecessary notification is not given to the user.

In step S1009, the image data is converted according to the set conversion condition. At this point, when the Internet facsimile mode is selected, the resolution and the paper size may need to be changed (varied) for some transmission destinations.

In step S1010, it is determined whether the conversion processing has been completed for all input pages. When the conversion processing has been completed for all input pages (YES in step S1010), the processing proceeds to step S1012 to transmit the e-mail to which the converted image data is attached. On the other hand, when the conversion processing has not been completed for all input pages (NO in step S1010), the processing proceeds to step S1011.

In step S1011, it is determined whether the user instructs cancel of the processing. According to the first exemplary embodiment, after the notification is given to the user in step S1008, unless the user instructs cancel of the processing, the conversion processing on the image data and the transmission processing on the transmission data after conversion are performed. However, when the user who has received the notification in step S1008 instructs cancel of the processing, the conversion processing on the image data and the transmission processing on the transmission data after conversion are canceled.

As a result of the determination in step S1011, if the user has not instructed cancel of the processing (No in step S1101), the processing returns to step S1109 to continue the conversion processing. On the other hand, if the user has instructed cancel of the processing, the converted data of the page is discarded and the processing is terminated.

FIG. 12 is a flowchart for illustrating details of the processing performed in step S1006 illustrated in FIG. 10. FIG. 12 illustrates the processing performed when the e-mail mode is selected as the transmission mode. A case where the Internet facsimile mode is selected as the transmission mode will be described below with reference to FIG. 13.

In step S1201, with reference to tables illustrated in FIGS. 7A, 7B, and 8A, the equation corresponding to the reading setting and the conversion condition is acquired. Using the acquired equation, the estimated value of the data size of the transmission data that is acquired after conversion is calculated from the data size of the image data (scanned data) input from the scanner 221.

In step S1202, it is determined whether the file format set via the operation screen illustrated in FIG. 4 is "JPEG". When it is determined that the file format is "JPEG" (YES in step S1202), the processing proceeds to step S1205 to perform the correction according to the compression ratio of the JPEG setting set via the operation screen illustrated in FIG. 5. For example, when the button 501 illustrated in FIG. 5 is selected, the estimated value calculated in step S1201 is multiplied by 0.564.

As a result of the determination in step S1202, if the file format is not "JPEG" (NO in step S1202), the processing proceeds to step S1203. When the e-mail mode is selected, the file format is either "JPEG" or "PDF". Thus, in step S1203, it is determined whether the set file format is "HIGH-COMPRESSED PDF" or "NON-HIGH COMPRESSED PDF".

As a result of the determination in step S1203, if the file format is "HIGH-COMPRESSED PDF", the processing proceeds to step S1204 to perform the correction according to the background image quality level of the high-compressed PDF setting set via the operation screen illustrated in FIG. 5. For example, when the button 504 illustrated in FIG. 5 is selected, the estimated value calculated in step S1201 is multiplied by 0.661.

On the other hand, as a result of the determination in step S1203, if the file format is "NON-HIGH COMPRESSED PDF", the processing proceeds to step S1205 to perform the correction according to the compression ratio of the JPEG setting set via the operation screen illustrated in FIG. 5. This is because, when "NON-HIGH COMPRESSED PDF" is set, the actual content of the data is similar to that of "JPEG", and thus the similar correction is necessary as a case of "JPEG".

After the processing in step S1204 or step S1205 is performed, the processing proceeds to step S1206 to determine whether character recognition processing is specified via the operation screen illustrated in FIG. 4. If the character recognition processing is specified (YES in step S1206), the processing proceeds to step S1207 to perform the correction for adding a constant number 1000 (Byte) to the estimated value corrected in step S1204 or step S1205.

On the other hand, as a result of the determination in step S1206, when the character recognition processing is not specified (NO in step S1206), the processing in step S1207 is omitted, and the processing proceeds to step S1208.

In step S1208, it is determined whether addition of an electronic signature is specified via the operation screen illustrated in FIG. 4. If addition of the electronic signature is specified (YES in step S1208), the processing proceeds to step S1209 to perform the correction for adding the constant number 1000 (Byte) to the estimated value corrected in step S1204 or step S1205, or to the estimated value further corrected in step S1207.

In step S1210, it is determined whether there is any unprocessed page. If there is no unprocessed page (NO in step S1210), the processing proceeds to step S1211. On the other hand, if there is any unprocessed page left (YES in step S1210), the processing returns to step S1201 to perform the processing on the following pages.

In step S1211, the collection for multiplying the estimated value acquired as the result of the processing in steps S1201 to S1210 by 1.33 is performed. This correction is performed, since the data size is increased when the data to be attached to the e-mail is encoded by a Base 64 method.

By the processing described above, the estimated value of the data size of the transmission data when the e-mail mode is selected is calculated. Next, a case where the Internet facsimile mode is selected as the transmission mode is described.

Figure 14:
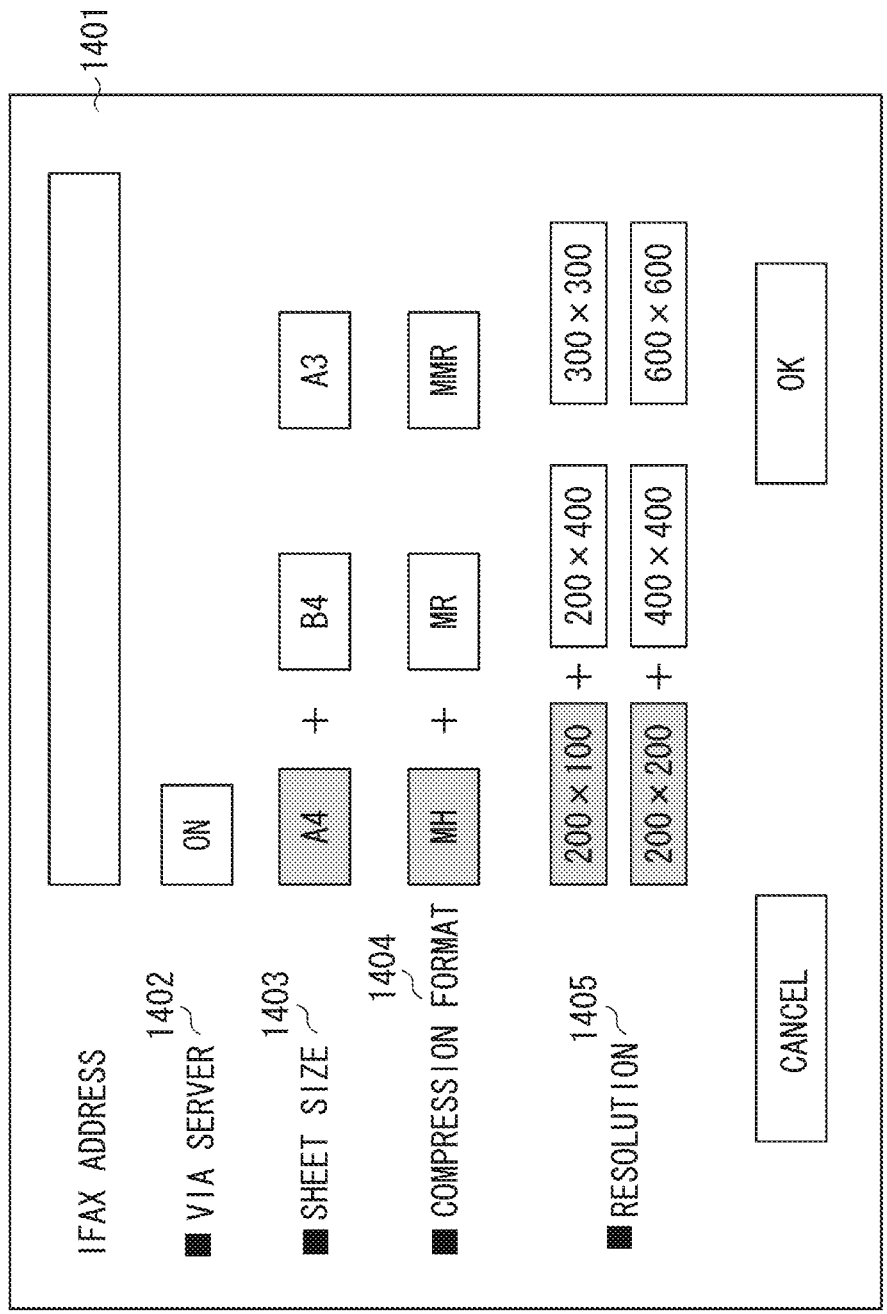
FIG. 14 illustrates a screen example displayed on the operation unit according to the exemplary embodiment of the present invention.

FIG. 14 illustrates an example of an operation screen on which the transmission setting is performed for transmitting the image data in the Internet facsimile mode. The user can set a reception capacity of the transmission destination via the operation screen when transmitting the data, and capacity information indicating the set reception capacity is registered. The reception capacity of the transmission destination is not specified every time the data is transmitted, but the capacity information indicating the reception capacity of the transmission destination can be registered in an address book in advance. The mail address of the transmission destination (an apparatus corresponding to the Internet facsimile, in this case) is input in an item 1401.

An item 1402 is used to select whether to transmit the e-mail via the mail server 103 or directly transmit the e-mail to a destination apparatus not via the mail server 103. When the setting of the item 1402 is "ON", the e-mail is transmitted via the mail server, and when the setting of the item 1402 is "OFF", the e-mail is transmitted not via the mail server.

An item 1403 is used to select the paper size which the transmission destination can process. An item 1404 is used to select a compression method which the transmission destination can process. An item 1405 is used to select the resolution which the transmission destination can process. Regarding the paper size and the resolution, when the reading parameter set via the operation screen illustrated in FIG. 4 is different from the processing capacity set via the operation screen illustrated in FIG. 14, the image data is converted by adopting the lower values of the capacities of the paper size and the resolution. For example, while the reading setting is "A3", when the capacity of the transmission destination is "A4", the image data in A3 size input from the scanner 221 is varied to that in A4 size.

FIG. 13 is a flowchart illustrating details of the processing performed in step S1006 illustrated in FIG. 10, when the Internet facsimile mode is selected.

In step S1301, it is determined whether the e-mail is set to be transmitted via the mail server. If the e-mail is set to be transmitted via the mail server (YES in step S1301), the processing proceeds to step S1302. Or, if not (NO in step S1301), the processing proceeds to step S1303.

In step S1303, the estimated value of the data size of the transmission data is set to zero. This is because, when the e-mail is transmitted not via the mail server, a possibility that a transmission error caused by the large data size occurs is low, and thus it is not necessary to notify the user even if the data size becomes large. If the e-mail is transmitted not via the mail server, the notification may be given to the user to avoid increase of network traffic. In this case, the processing proceeds to step S1302 without performing the determination in step S1301.

In step S1302, the equation corresponding to the reading setting is acquired with reference to the table illustrated in FIG. 8B. Using the acquired equation, the estimated value of the data size of the transmission data that is acquired after conversion is calculated from the data size of the image data (scanned data) input from the scanner 221.

In step S1304, the estimated value calculated in step S1302 is corrected according to the transmission destination selected in step S1001. More specifically, when the image data in A3 size is varied to that in A4 size, the image is reduced to 70%. Thus, the estimated value calculated in step S1302 is multiplied by 0.70. Further, for example, when the image data read at the resolution of "300×300 dpi" is transmitted to the transmission destination having the resolution capacity of "200×200 dpi", the image is reduced to 44%. Thus, the estimated value is multiplied by 0.44. On the other hand, when the image data does not need to be varied, the correction is not performed in step S1304.

In step S1305, it is determined whether there is any unprocessed page left. If there is no unprocessed page (NO in step S1305), the processing proceeds to step S1306. On the other hand, if there is any unprocessed page left (YES in step S1305), the processing returns to step S1302 to perform the processing on the following pages.

In step S1306, it is determined whether there is any unprocessed transmission destination left. If there is no unprocessed transmission destination left (NO in step S1306), the processing proceeds to step S1307. On the other hand, if there is any unprocessed transmission destination left (YES in step S1306), the processing returns to step S1301 to perform the processing on the following transmission destinations. In step S1306, a case where a plurality of transmission destinations can be selected at the same time is described, however, only one transmission destination may be selected at a time.

In step S1307, among the estimated values calculated and corrected for each destination, the largest estimated value is selected, and then the processing proceeds to step S1308.

In step S1308, the correction for multiplying the estimated value selected in step S1307 by 1.33 is performed. This correction is performed, since the data size is increased when the data to be attached to the e-mail is encoded by a Base 64 method. According to the processing described above, the estimated value of the data size of the transmission data when the Internet facsimile mode is selected is calculated.

As described above, according to the first exemplary embodiment, a table in which conversion conditions for converting the input image data and information indicating relationships between data sizes of image data before conversion and data sizes of transmission data that are acquired after conversion are associated with each other is stored in the HDD 214.

When a specific conversion condition is set via the operation screens illustrated in FIGS. 4, 5, and 14, the data size of the transmission data that is acquired when the image data input from the scanner 221 is converted is estimated using the information stored in the tables (FIGS. 7 and 8). Based on a result of the estimation, the user is informed that the data size can be large (FIG. 11).

With the configuration described above, the estimated value of the data size of the transmission data can be calculated without necessity of actually converting the image data input from the scanner 221, and thus a notification can be promptly given to the user.

Next, a second exemplary embodiment of the present invention will be described. According to the second exemplary embodiment, compared with the first exemplary embodiment, the processing following step S1007 illustrated in FIG. 10 is different from those in the first exemplary embodiment. The same reference numerals are used to configurations which are identical to those in the first exemplary embodiment described above, and descriptions thereof will not be repeated.

Figure 15:
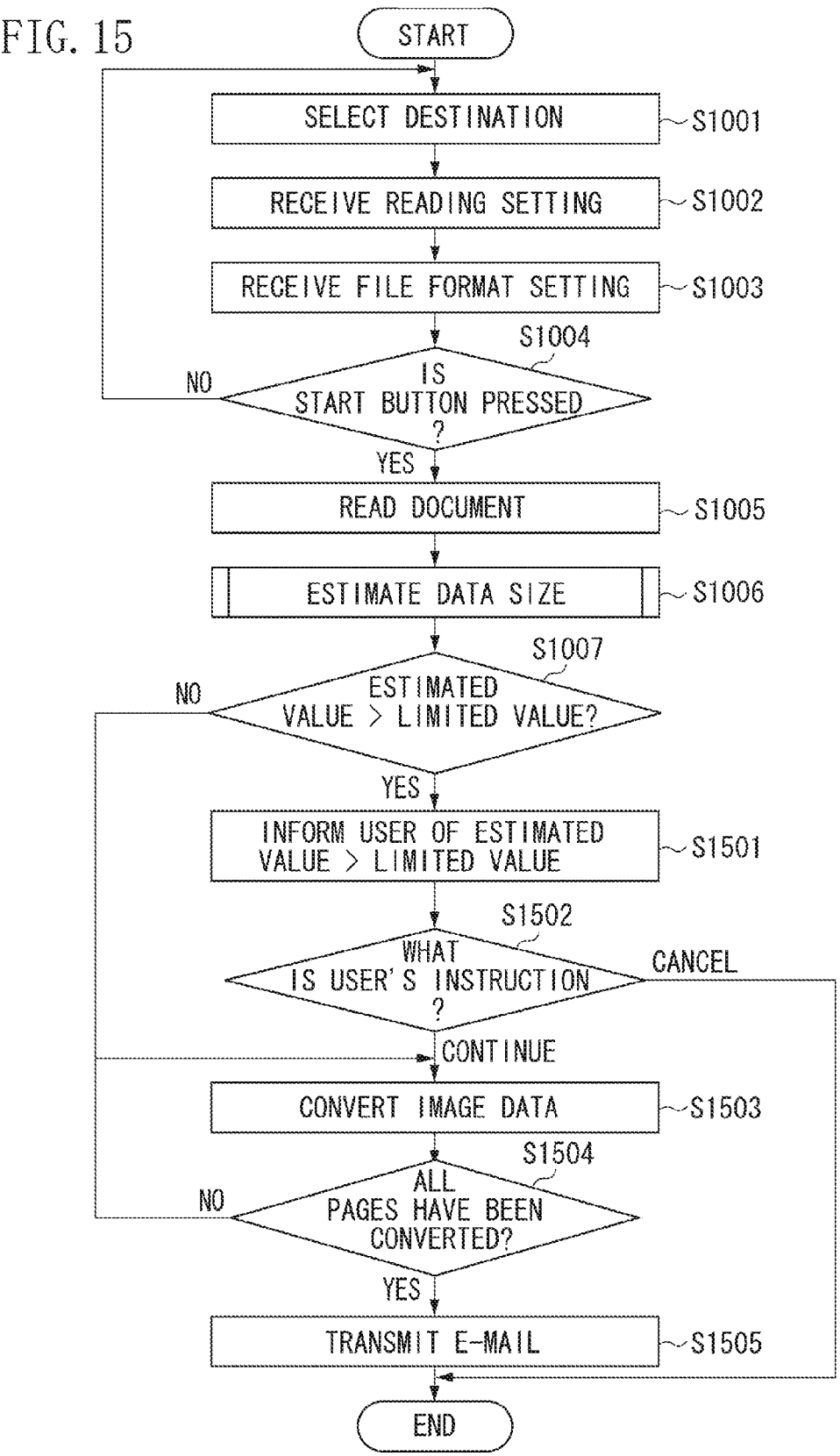
FIG. 15 is a flowchart illustrating an operation of the MFP according to the exemplary embodiment of the present invention.

FIG. 15 is a flowchart illustrating a series of processing for attaching image data, which is read from a document with the scanner 221 and input, to the e-mail and transmitting it. Each operation (step) illustrated in the flowchart of FIG. 15 is realized when the CPU 211 in the MFP 101 executes the control program stored in the HDD 214. Since the processing performed in steps S1001 to S1007 are similar to those described with reference to FIG. 10, the detail descriptions of the processing will not be repeated.

In step S1007, it is determined whether the calculated estimated value exceeds the limited value or not. If the estimated value exceeds the limited value (YES in step S1007), the processing proceeds to step S1501. If not (NO in step S1007), the processing proceeds to step S1503.

In step S1501, the screen illustrated in FIG. 11 is displayed on the operation unit 219 to inform the user that the data size of the transmission data is large. In addition to the contents illustrated in FIG. 11, a button for instructing "CONTINUE" and a button for instructing "CANCEL" are displayed. Further, in addition to the message illustrated in FIG. 11, information such as the calculated estimated value and the set limited value may be notified to the user.

In step S1502, it is determined that the contents of the instruction from the user who has checked the screen illustrated in FIG. 11. When the instruction from the user is "CONTINUE", the processing proceeds to step S1503. When the instruction from the user is "CANCEL", the processing is terminated. When predetermined time has elapsed without any instructions from the user, the processing is also terminated.

In step S1503, the image data is converted according to the set conversion conditions. At this point, when the Internet facsimile mode is selected, the resolution and the paper size may need to be changed (varied) for some transmission destinations.

In step S1504, it is determined whether the conversion processing has been completed for all input pages. When the conversion processing has been completed for all input pages (YES in step S1504), the processing proceeds to step S1505 to transmit the e-mail to which the converted image data is attached. On the other hand, when the conversion processing has not been completed for all input pages (NO in step S1504), the processing returns to step S1503 to continue to perform the conversion processing.

As described above, according to the second exemplary embodiment, after the notification is given to the user, conversion of the image data and transmission of the transmission data after the conversion are started according to issuance of the instruction to continue the processing from the user. Thus, when the user who has received the notification wants to cancel the processing, the conversion processing and the transmission processing do not have to be performed, so that a workload of the apparatus can be reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-021270 filed Feb. 2, 2010, which is hereby incorporated by reference herein in its entirety.

What is claimed is:

1. An image processing apparatus comprising:
   an input unit configured to input image data;
   a storage unit configured to store a plurality of conversion conditions for converting the image data input by the input unit and, if the image data is converted according to each conversion condition, information indicating a relationship between a data size of the image data before conversion and a data size of transmission data that is acquired after conversion by associating the conversion conditions and the information with each other;
   a setting unit configured to set the conversion condition for converting the image data input by the input unit according to an instruction from a user;
   an estimation unit configured to, if the conversion condition is set by the setting unit, estimate the data size of the transmission data that is acquired when the image data input by the input unit is converted according to the set conversion condition, using the information stored in the storage unit;
   a notification unit configured to issue a notification to the user based on a result of the estimation performed by the estimation unit;
   a transmission unit configured to convert the image data input by the input unit according to the conversion condition set by the setting unit and transmit the transmission data that is acquired by the conversion as an e-mail;
   a first determination unit configured to determine whether to transmit the e-mail via a mail server or not via the mail server; and
   a second determination unit configured to determine whether the data size of the transmission data that is estimated by the estimation unit exceeds a predetermined limited value,
   wherein the notification unit issues the notification to the user if the second determination unit determines that the data size of the transmission data estimated by the estimation unit exceeds the predetermined limited value and the first determination unit determines that the e-mail is transmitted via the mail server, and does not issue the notification to the user if the second determination unit determines that the data size of the transmission data estimated by the estimation unit does not exceed the predetermined limited value or the first determination unit determines that the e-mail is transmitted not via the mail server.

2. The image processing apparatus according to claim 1, further comprising a reading unit configured to read an image on a document and generate image data based on the image,
wherein the input unit inputs the image data generated by the reading unit.

3. The image processing apparatus according to claim 1, wherein if the user issues an instruction to cancel processing after the notification unit issues the notification to the user, the transmission unit cancels conversion of the image data or transmission of the transmission data that is acquired by the conversion.

4. The image processing apparatus according to claim 1, wherein, responding to the instruction from the user to continue the processing after the notification unit issues the notification to the user, the transmission unit starts conversion of the image data and transmission of the transmission data that is acquired by the conversion.

5. The image processing apparatus according to claim 1,
wherein the setting unit can set capacity information indicating a reception capacity of a transmission destination corresponding to each transmission destination, and
wherein, if a transmission destination of the image data is specified, the estimation unit estimates the data size of the transmission data based on a conversion condition determined according to the reception capacity set corresponding to the specified transmission destination and the information stored in the storage unit.

6. The image processing apparatus according to claim 1, wherein the conversion condition includes at least any one of specifications of a file format, a resolution, a paper size, a compression ratio, an image quality level, whether to use a character recognition function, and whether to add an electronic signature.

7. A method for controlling an image processing apparatus, the method comprising:
inputting image data;
storing a plurality of conversion conditions for converting the input image data and, if the image data is converted according to each conversion condition, information indicating a relationship between a data size of the image data before conversion and a data size of transmission data that is acquired after conversion by associating the conversion conditions and the information with each other;
setting the conversion condition for converting the input image data according to an instruction from a user;
estimating, if the conversion condition is set, the data size of the transmission data that is acquired when the input image data is converted according to the set conversion condition, using the information stored in the storage unit;
issuing a notification to the user based on a result of the estimation;
converting the input image data according to the set conversion condition, and transmitting the transmission data that is acquired by the conversion as an e-mail;
determining whether to transmit the e-mail via a mail server or not via the mail server; and
determining whether the data size of the transmission data that is estimated exceeds a predetermined limited value,
wherein the notification issues the notification to the user if the determination determines that the data size of the transmission data estimated exceeds the predetermined limited value and the determination determines that the e-mail is transmitted via the mail server, and does not issue the notification to the user if the determination determines that the data size of the transmission data estimated does not exceed the predetermined limited value or the determination determines that the e-mail is transmitted not via the mail server.

8. A non-transitory storage medium that stores a program for causing a computer to execute a method according to claim 7.

* * * * *